(12) United States Patent
Schürmann

(10) Patent No.: US 11,305,592 B2
(45) Date of Patent: Apr. 19, 2022

(54) PNEUMATIC VEHICLE TIRE

(71) Applicant: Continental Reifen Deutschland GmbH, Hannover (DE)

(72) Inventor: Oliver Schürmann, Langenhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 345 days.

(21) Appl. No.: 15/781,118

(22) PCT Filed: Aug. 29, 2016

(86) PCT No.: PCT/EP2016/070271
§ 371 (c)(1),
(2) Date: Jun. 2, 2018

(87) PCT Pub. No.: WO2017/092892
PCT Pub. Date: Jun. 8, 2017

(65) Prior Publication Data
US 2018/0290505 A1    Oct. 11, 2018

(30) Foreign Application Priority Data

Dec. 4, 2015  (DE) .................... 10 2015 224 294 .3

(51) Int. Cl.
*B60C 5/14*  (2006.01)
*B60C 19/00*  (2006.01)
(Continued)

(52) U.S. Cl.
CPC ............ *B60C 19/002* (2013.01); *B60C 11/04* (2013.01); *B60C 13/02* (2013.01); *B60C 2013/026* (2013.01)

(58) Field of Classification Search
CPC ..... B60C 19/002; B60C 19/001; B60C 19/00; B60C 5/00; B60C 5/14; B60C 2013/026;
(Continued)

(56) References Cited

U.S. PATENT DOCUMENTS

2005/0161138 A1* 7/2005 Yukawa .............. B60C 11/0318
152/450
2007/0131326 A1 6/2007 Yukawa et al.
(Continued)

FOREIGN PATENT DOCUMENTS

CN        1192410 A      9/1998
CN     101535541 A      9/2009
(Continued)

*Primary Examiner* — Cedrick S Williams
(74) *Attorney, Agent, or Firm* — Gregory Adams; David L. Cate

(57) ABSTRACT

A pneumatic vehicle tire of a radial type of construction with a profiled tread (1), sidewalls (3), bead regions (2) and an airtight inner layer (4), which forms the inner side (4*a*) facing the interior space of the pneumatic vehicle tire, ribs (6) being formed on the inner layer (4), having been imprinted in it by a heating bladder introduced into the interior of the tire during the vulcanizing of the pneumatic vehicle tire in a tire heating mold, and a sound absorber (5) being provided so as to extend in an annular manner on a circumferential region (4*b*) of the inner side (4*a*) opposite from the tread (1).
Grooves (7) have been formed by the heating bladder at least in a partial region of the circumferential region (4*b*) of the inner layer (4*a*) on which the sound absorber (5) is provided.

14 Claims, 2 Drawing Sheets

(51) Int. Cl.
*B60C 11/04* (2006.01)
*B60C 13/02* (2006.01)
*B60C 13/00* (2006.01)

(58) Field of Classification Search
CPC .... B29D 2030/2635; B29D 2030/2614; B29D 2030/2628; B29D 30/0654; B29D 30/0601; B29D 30/00
See application file for complete search history.

(56) References Cited

U.S. PATENT DOCUMENTS

| | | |
|---|---|---|
| 2010/0043907 A1 | 2/2010 | Deseyne et al. |
| 2010/0043937 A1 | 2/2010 | Matsunaga et al. |
| 2011/0220264 A1 | 9/2011 | Nagai |

FOREIGN PATENT DOCUMENTS

| | | | |
|---|---|---|---|
| CN | 205539037 U | | 8/2016 |
| DE | 19750229 A1 | | 6/1999 |
| DE | 19806135 A1 | | 8/1999 |
| DE | 102009036460 A1 | | 2/2010 |
| EP | 1798075 A2 | | 6/2007 |
| JP | 2007161070 A | | 6/2007 |
| JP | 2007168541 A | | 7/2007 |
| JP | 2008308089 A | * | 12/2008 |
| JP | 201047074 A | | 9/2011 |
| JP | 2011178133 A | | 9/2011 |
| JP | 2011189796 A | | 9/2011 |
| JP | 2015020731 A | | 2/2015 |

\* cited by examiner

PNEUMATIC VEHICLE TIRE

The invention relates to a pneumatic vehicle tire of a radial type of construction with a profiled tread, sidewalls, bead regions and an airtight inner layer, which forms the inner side facing the interior space of the pneumatic vehicle tire, ribs being formed on the inner layer, having been imprinted in it by a heating bladder introduced into the interior of the tire during the vulcanizing of the pneumatic vehicle tire in a tire heating mold, and a sound absorber being provided so as to extend in an annular manner on a circumferential region of the inner side opposite from the tread.

It is known to introduce a foam ring into the interior of the tire to reduce the occurrence of noise that is externally emitted during the operation or rolling of the tire and is heard in the interior of the vehicle. Thus, for example, DE 198 06 135 A1 discloses a method for producing a pneumatic vehicle tire having a sound-absorbing foam layer adhering to the inner layer, wherein the tire is already covered with the foam layer before vulcanization and the foam layer is chemically and/or mechanically bonded to the inner layer during vulcanization. In the case of the pneumatic vehicle tire known from DE 197 50 229 A1, a layer of closed-cell foam, which is bonded to the inner side by adhesion, is located on the tire inner side.

It is usual in practice to bond the sound absorber over its full surface area to the inner side of the pneumatic vehicle tire, a polyurethane gel usually being used. The view has been taken up to now that only full surface-area adhesive bonding can ensure sufficient certainty that the sound absorber will not undesirably detach itself from the inner side of the pneumatic vehicle tire. Furthermore, this measure has been considered to be the easiest solution technically in terms of production. In this case, the entire inner side of the pneumatic vehicle tire opposite from the tread is provided with the bonding agent or adhesive, and then the sound absorber is adhesively attached to the portion of the circumference intended for it on the inner side. For safety reasons, the full surface-area adhesive bonding that has been usual until now is also carried out using a relatively thick layer of bonding agent or adhesive, whereby the weight of the pneumatic vehicle tire is increased, while the large amount of bonding agent that is required is economically disadvantageous.

The invention is based on the object of optimizing the adhesive bonding between the sound absorber and the pneumatic vehicle tire in the case of a pneumatic vehicle tire of the type mentioned at the beginning, while continuing to ensure secure adhesive attachment of the sound absorber and at the same time reducing weight. The measures to be taken are intended to be easily implementable technically in terms of production.

The set object is achieved according to the invention by grooves having been formed by the heating bladder at least in a partial region of the circumferential region of the inner layer on which the sound absorber is provided.

Therefore, in addition to the ribs formed by the heating bladder during the vulcanizing of the pneumatic vehicle tire, grooves are imprinted in the tire inner layer. These grooves increase the effective contact area or adhesive-bonding area for providing the sound absorber on the inner side of the pneumatic vehicle tire. If full surface-area adhesive bonding is still performed, the bonding of the sound absorber on the inner side of the pneumatic vehicle tire is improved, while at the same time less bonding agent can be used since a greater adhesive-bonding area is available. Depending on the design and arrangement of the grooves, it is also possible to dispense with full surface-area adhesive bonding of the sound absorber on the inner side of the pneumatic vehicle tire; it is possible just to perform adhesive bonding in the region of the grooves that are formed. Thus, on the one hand, expensive bonding agent can be saved and, on the other hand, a reduction of the overall weight of the pneumatic vehicle tire can also be achieved. Since the grooves are imprinted by means of the heating bladder in a way analogous to the ribs, the invention can be easily realized technically in terms of production.

In the case of a preferred embodiment of the invention, the grooves are formed in a middle circumferential region of the inner layer that is free from ribs. Specifically in this region, the effect that can be achieved with the grooves, that is of increasing the contact area or adhesive-bonding area for providing the sound absorber, is particularly pronounced.

However, according to a further embodiment of the invention, it may also be advantageous to form the grooves laterally of a middle circumferential region of the inner layer that is free from ribs. This measure may be taken in addition or as an alternative, and is advantageous especially whenever a relatively wide sound absorber is to be provided on the inner side.

There are many possibilities for forming grooves according to the invention on the inner side of the tire. Particularly advantageous are those designs that make it possible to save bonding agent and nevertheless bond the sound absorber reliably and permanently to the inner side of the pneumatic vehicle tire. In the case of one of these possibilities, the grooves are formed as running at least essentially parallel to the ribs. In the case of further embodiments, the grooves or portions of grooves may be formed as running between ribs, or it may be provided that grooves or portions of grooves cross the ribs.

With respect to the path along which they run, or their extent, the grooves can likewise be designed in many various ways. Thus, it is possible to provide grooves which run in the circumferential direction of the tire or alternatively to provide grooves which run in the axial direction. The grooves may however also run in the form of a circle or in some other way along uninterrupted paths or, in the case of further design variants, in the form of a wave or zigzag.

In a particularly reliable and therefore also easy way, grooves that have specific dimensions can be imprinted in the inner layer of the pneumatic vehicle tire. It is favorable in this connection if grooves which have on the inner side of the inner layer a width of 2 mm to 4 mm and a mutual spacing of 2 mm to 9 mm are imprinted. The depth of the grooves with respect to the level of the inner side of the inner layer is preferably 0.5 mm to 1 mm. Imprinting grooves which have a round, for example semicircular, cross section is particularly easy.

Further features, advantages and details of the invention will now be explained in more detail on the basis of the schematic drawing. In the figures.

Figure 1:
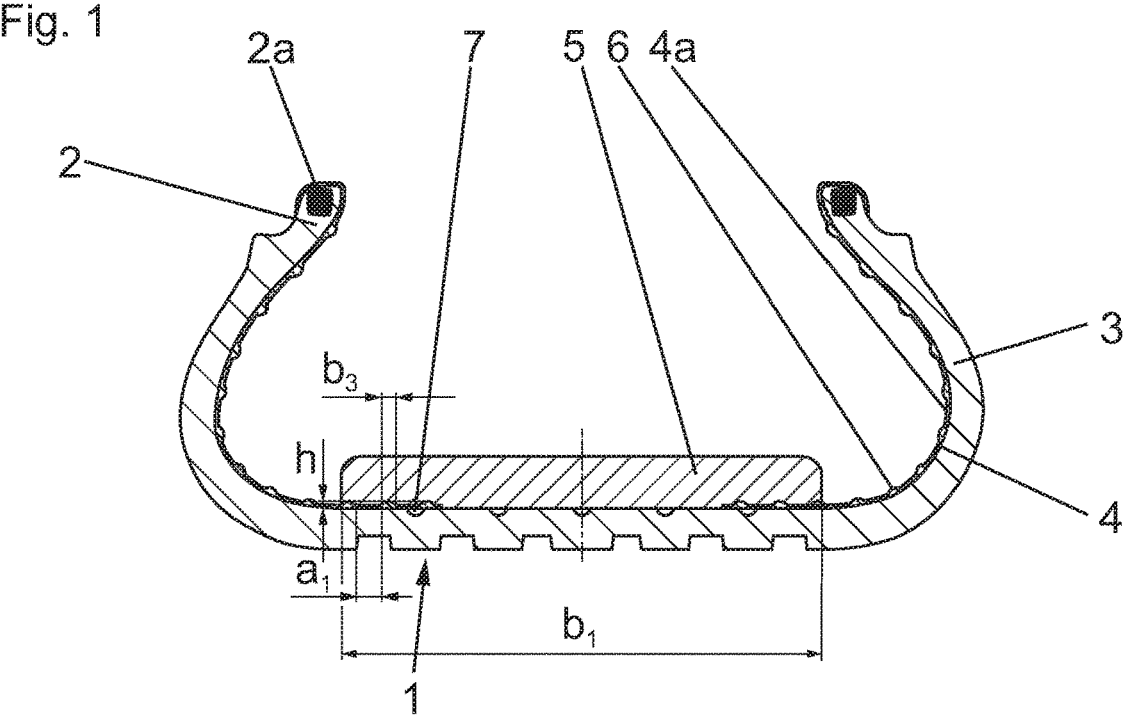
FIG. 1 shows a cross section through a pneumatic vehicle tire.

FIG. 1 schematically shows the cross section of a tubeless pneumatic vehicle tire of a radial type of construction, intended in particular for passenger cars, vans or light trucks, with a profiled tread 1, bead regions 2, in which a bead core 2a is respectively anchored, and sidewalls 3. Not shown are further components that reinforce the pneumatic vehicle tire, such as a radial carcass and a multi-ply breaker belt. The pneumatic vehicle tire has an airtight inner layer 4, which covers and forms the inner side 4a of the tire. FIG. 1 also shows a sound absorber 5, which extends in an annular manner on the inner side 4a of the pneumatic vehicle tire, is bonded to the inner side 4a by being adhesively attached either over its full surface area or partially, and preferably consists of a thermoplastic or elastomeric foam, in particular of polyurethane foam. The sound absorber 5 has a constant width $b_1$ over the circumference of the tire, which is between 30% and 100% of the ground contact area of the tire. The likewise constant thickness of the sound absorber 5 is between 5% and 20% of the width $b_1$, and therefore for example between 20 mm and 50 mm, depending on the tire size.

Figure 2:
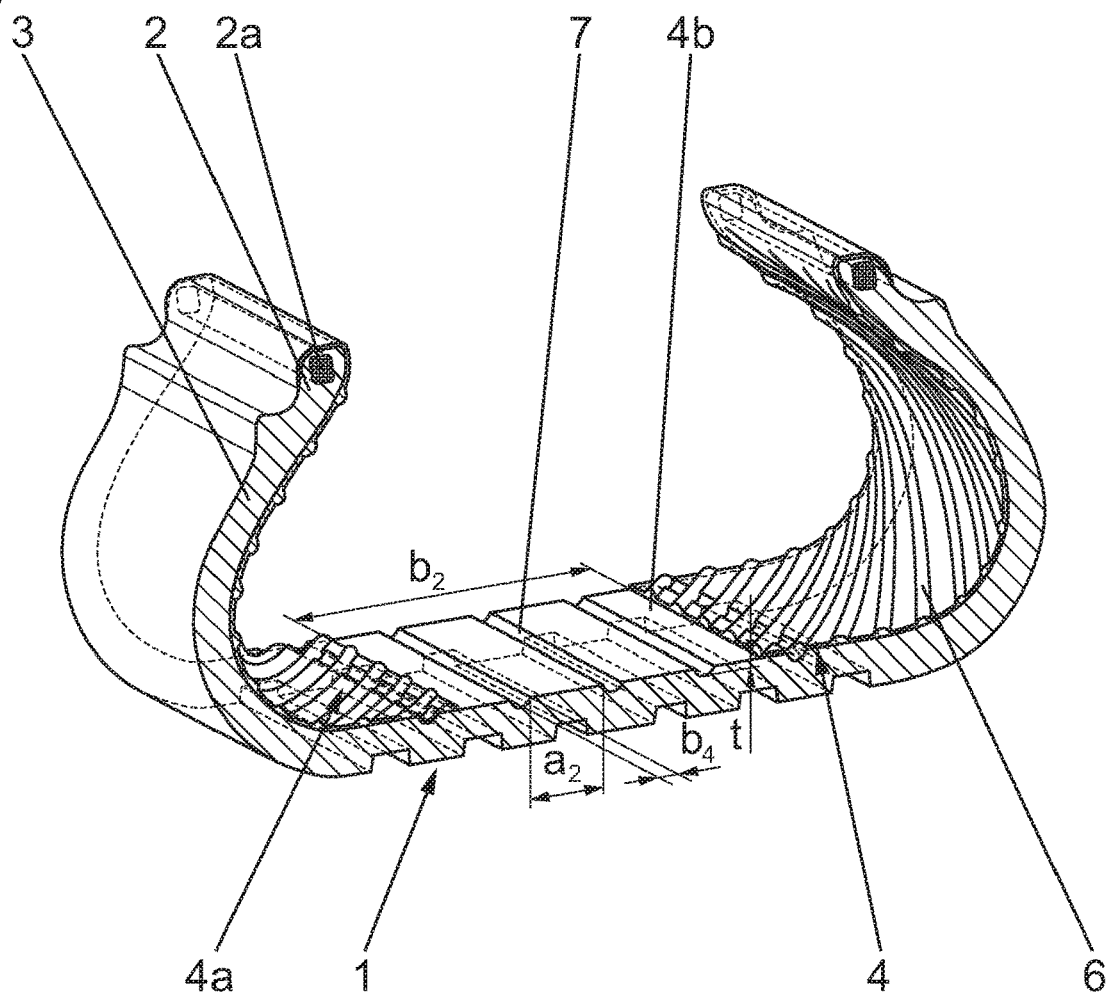
FIG. 2 shows a view of a circumferential portion of the pneumatic vehicle tire with a view of the inner side of the pneumatic vehicle tire and FIG. 3 and FIG. 4 show plan views of details of the inner side of a pneumatic vehicle tire with different design variants of the invention.

As shown for example by FIG. 2, a multiplicity of ribs 6 running parallel to one another are formed on the inner side 4a of the tire. The ribs 6 are formed during the vulcanizing of the pneumatic vehicle tire in a tire heating mold by the heating bladder that is introduced into the tire to be vulcanized and is charged inside with a hot medium, for example hot steam. A multiplicity of grooves are usually formed on the outer side of the heating bladders, in order to ensure dissipation of the air between the heating bladder and the green tire during the forming of the imprint by the heating bladder. If the heating bladder filled with heating medium lies against the inner side of the green tire, it imprints the mentioned ribs 6 into the inner layer 4. These ribs 6 usually run in the way shown in FIG. 2, in most cases without any ribs 6 being formed in a central circumferential region 4b on the inner side 4a. In most cases, this circumferential region 4b has in the axial direction a width $b_2$ of 20 mm to 100 mm. On each side of this circumferential region 4b, the ribs 6 run between the edge of the circumferential region 4b into the respective bead region 2 obliquely in relation to the circumferential direction over the inner side 4a. At the region of the inner side 4a opposite from the tread 1, the ribs 6 form with the axial direction for example an acute angle of 30° to 45°. As shown in FIG. 1, the ribs 6 have at their base for example a width $b_3$ of 2 mm to 3 mm, their mutual spacing $a_1$ is usually 8 mm to 9 mm, their maximum height h in particular 0.5 mm to 1 mm. The cross-sectional area of the ribs 6 is also usually rounded, for example in an essentially semicircular manner, but may also be essentially rectangular.

According to the invention, at least in a partial region of the region of the inner side 4a of the inner layer 4 that comes into contact with the sound absorber 5, grooves 7 are thus imprinted by the heating bladder in addition to the ribs 6. The grooves 7 are therefore produced by corresponding elevations on the outer side of the heating bladder and are preferably located at most in that region of the inner layer in which it is intended to provide the sound absorber 5. As FIG. 2 shows, the grooves 7 on the inner side 4a of the inner layer 4 have a width $b_4$ of in particular 2 mm to 4 mm, their depth t is preferably 0.5 mm to 1 mm, their mutual spacing $a_2$ on the inner side 4a in particular 2 mm to 9 mm. In cross section, they are designed in particular in a trough-like manner, therefore are rounded for example in a semicircular manner, but may also have at their deepest point groove walls which converge to a point or may be bounded by groove walls which overall run essentially in a rectangular manner. In the case of the design shown in FIG. 1 and FIG. 2, the grooves 7 run in the circumferential direction, parallel to one another and in the middle circumferential region 4b, a groove 7 respectively running laterally of the circumferential region 4b and crossing ribs 6.

In the case of one possible design variant of the invention, grooves 7 are only formed in the middle circumferential region 4b of the inner layer 4 that is free from ribs 6. In principle, the grooves 7 may also run in the axial direction or obliquely or diagonally in relation to the circumferential direction of the tire, it being possible for their orientation to coincide with that of the ribs 6 and in this case for the grooves 7 to run between the ribs 6. In the case of further design variants of the invention, the grooves 7 run in the form of a wave or zigzag in any desired direction or along circles or other uninterrupted paths. Another possible design variant is one in which the grooves 7 are only formed laterally of the circumferential region that is free from ribs 6.

Figure 3:
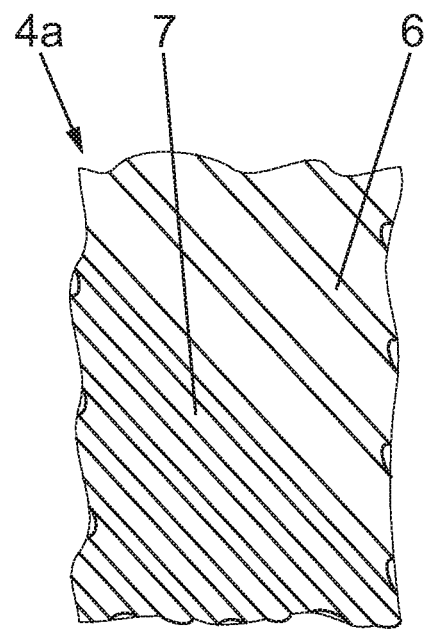
Figure 4:
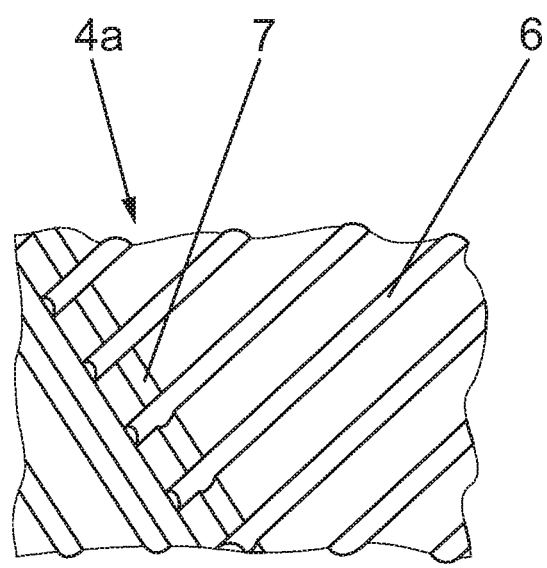

FIG. 3 shows a detail of the inner side 4a with grooves 7 which run between and parallel to the ribs 6. In the case of the detail shown in FIG. 4, grooves 7 running parallel to one another cross the ribs 6.

As mentioned, there are many other possibilities that are not shown for forming grooves 7 in that region in which the sound absorber 5 is provided. Since the grooves 7 increase the adhesive-bonding area with respect to the sound absorber 5 while the projected area remains the same size, on the one hand the thickness of the adhesive bonding layer can be reduced to achieve an at least essentially equally good adhesive force, whereby there is a saving of material, weight and also costs. The invention also makes it possible to adhesively attach the sound absorber 5 partially, and in particular in those regions where specifically grooves 7 are formed. This measure also makes it possible to save weight, material and costs.

LIST OF REFERENCE NUMERALS

1 . . . Tread
2 . . . Bead region
2a . . . Bead core
3 . . . Sidewall
4 . . . Inner layer
4a . . . Inner side
4b . . . Circumferential region
5 . . . Sound absorber
6 . . . Ribs
7 . . . Grooves
$a_1, a_2$ . . . Spacing
$b_1, b_2, b_3, b_4$ . . . Width
h . . . Height
t . . . Depth

The invention claimed is:

1. A pneumatic vehicle tire of a radial type of construction comprising a profiled tread, sidewalls, bead regions and an airtight inner layer which forms an inner side facing an interior space of the pneumatic vehicle tire, wherein ribs are formed on the airtight inner layer by being imprinted during the vulcanizing of the pneumatic vehicle tire in a tire heating mold, and wherein a sound absorber is provided which extends in an annular manner on a circumferential region of an inner side opposite from the profiled tread;

wherein the ribs are formed on an inner side of the airtight inner layer;

grooves are only formed on the circumferential region of the inner side opposite from the profiled tread and positioned between the sound absorber and the inner side opposite from the profiled tread of the circumferential region;

the ribs are formed on the inner side at least partially within the circumferential region;

the sound absorber comprises a thermoplastic foam and is adhesively attached to the inner layer in at least the circumferential region where the grooves are formed by an adhesive bonding layer;

the sound absorber having a constant width b1 over the circumference of the tire and having a thickness between 5% and 20% of the constant width b1.

2. The pneumatic vehicle tire as claimed in claim 1, wherein the ribs are imprinted from grooves of the heating bladder to facilitate dissipation of air during the vulcanization.

3. The pneumatic vehicle tire as claimed in claim 1, wherein the ribs are formed having an axial direction with an acute angle of 30 degrees to 45 degrees.

4. The pneumatic vehicle tire as claimed in claim 1, the grooves run in a circumferential direction parallel to one another.

5. The pneumatic vehicle tire as claimed in claim 1, the grooves run in an axial direction.

6. The pneumatic vehicle tire as claimed in claim 1, further comprising the adhesive bonding layer between the sound absorber and the grooves within the circumferential region is configured to increase an adhesive-bonding area of the circumferential region with respect to the sound absorber and to mitigate a thickness of the adhesive bonding layer.

7. The pneumatic vehicle tire as claimed in claim 1, wherein a middle circumferential region of the airtight inner layer is at least partially free from the ribs.

8. The pneumatic vehicle tire as claimed in claim 7, wherein the profiled tread is formed on an outer layer and is opposite the middle circumferential region of the airtight inner layer.

9. The pneumatic vehicle tire as claimed in claim 1, wherein a plurality of inner grooves are formed in a middle circumferential region of the airtight inner layer.

10. The pneumatic vehicle tire as claimed in claim 9, wherein the inner grooves cross the ribs.

11. The pneumatic vehicle tire as claimed in claim 9, wherein the inner grooves have, a width (b4) of 2 mm to 4 mm.

12. The pneumatic vehicle tire as claimed in claim 9, wherein the inner grooves have a mutual spacing (a2) of 2 mm to 9 mm.

13. The pneumatic vehicle tire as claimed in claim 9, wherein the inner grooves have a depth (t) with respect to the level of the inner side of the airtight inner layer of 0.5 mm to 1 mm.

14. The pneumatic vehicle tire as claimed in claim 9, wherein the grooves have a round, semicircular, cross section.

* * * * *